United States Patent
McGuffee

(10) Patent No.: US 9,809,071 B2
(45) Date of Patent: Nov. 7, 2017

(54) PROTECTIVE COVER FOR TRAILER COUPLING

(71) Applicant: Dennis McGuffee, Gulfport, MS (US)

(72) Inventor: Dennis McGuffee, Gulfport, MS (US)

( * ) Notice: Subject to any disclaimer, the term of this patent is extended or adjusted under 35 U.S.C. 154(b) by 58 days.

(21) Appl. No.: 15/017,840

(22) Filed: Feb. 8, 2016

(65) Prior Publication Data

US 2017/0225529 A1    Aug. 10, 2017

(51) Int. Cl.
*B60D 1/60* (2006.01)

(52) U.S. Cl.
CPC .................... *B60D 1/605* (2013.01)

(58) Field of Classification Search
USPC ................. 280/507, 770, 512, 513
See application file for complete search history.

(56) References Cited

U.S. PATENT DOCUMENTS

| | | | | |
|---|---|---|---|---|
| 2,714,912 A * | 8/1955 | Gonnella | ................. | B60D 1/60 150/154 |
| 3,924,878 A * | 12/1975 | Utman | .................... | B60D 1/60 280/507 |
| 5,037,122 A * | 8/1991 | Beckerer, Jr. | ............ | B60D 1/60 150/166 |
| 5,407,219 A * | 4/1995 | Chiu | ........................ | B60D 1/60 280/422 |
| 5,651,559 A * | 7/1997 | Liland | ..................... | B60D 1/60 280/507 |
| 5,681,053 A * | 10/1997 | Misukanis | ............... | B60D 1/60 280/507 |
| 5,791,677 A * | 8/1998 | Froehlich | ................. | B60D 1/60 150/166 |
| 6,039,339 A * | 3/2000 | Bello | ........................ | B60D 1/60 150/166 |
| 6,322,094 B1 * | 11/2001 | Poe | .......................... | B60D 1/60 280/507 |
| 6,439,008 B1 * | 8/2002 | Keil | ........................ | B60D 1/60 70/54 |
| 8,070,178 B2 * | 12/2011 | Desmarais | ............... | B60D 1/60 150/166 |
| 9,272,590 B2 * | 3/2016 | Hochanadel | ........... | B60D 1/363 |
| 9,630,464 B2 * | 4/2017 | Hochanadel | ........... | B60D 1/363 |
| 2006/0181060 A1 * | 8/2006 | Bussiere | ................... | B60D 1/60 280/507 |
| 2007/0235983 A1 * | 10/2007 | Braun | ....................... | B60D 1/60 280/507 |
| 2009/0102159 A1 * | 4/2009 | Van Laere | ............... | B60D 1/60 280/507 |
| 2009/0200771 A1 * | 8/2009 | Prine | ........................ | B60D 1/60 280/507 |

(Continued)

*Primary Examiner* — Kevin Hurley
*Assistant Examiner* — Gabriela C Craciun
(74) *Attorney, Agent, or Firm* — J. Hunter Adams; Stephen Thompson; Gary Stewart

(57) ABSTRACT

Disclosed is a protective cover for trailer coupling devices. The protective cover includes a shaft with a hollowed inner core for housing a trailer coupling device and a protective pad that is adjoined to one end of the shaft. When installed, the protective casing cover protects a trailer's coupling device from adverse weather conditions. Additionally, upon installation, the protective pad of the protective cover serves to prevent or reduce damage to a vehicle when a driver backs up too far while trying to align a vehicle's trailer hitch with a trailer's coupling device.

18 Claims, 4 Drawing Sheets

(56) References Cited

U.S. PATENT DOCUMENTS

| | | | |
|---|---|---|---|
| 2010/0025965 A1* | 2/2010 | Caldwell | B60D 1/60 280/507 |
| 2010/0320730 A1* | 12/2010 | Ferland | B60D 1/605 280/507 |
| 2011/0101648 A1* | 5/2011 | Hsai | B60D 1/60 280/507 |

* cited by examiner

PROTECTIVE COVER FOR TRAILER COUPLING

FIELD OF THE INVENTION

A preferred embodiment of the present invention refers to a device for covering the coupling mechanism of a trailer.

BACKGROUND

Trailers are frequently coupled with vehicles and used to transport property from location to location. Although trailers vary in regards to size, shape, and structure depending on the cargo the trailer is designed to haul, trailers are usually coupled to vehicles in the same general fashion. A trailer hitch mounted to the back of a vehicle is engaged with and locked to a coupling device present on the front of a trailer. Generally, the trailer hitch is centered on the backside of the vehicle and mounted below the bumper region of the vehicle such that it is out of the driver's sight while operating the vehicle. Moreover, because the driver must backup and position the vehicle such that the hitch is aligned with the trailer's coupling device, the trailer's coupling device is also out of the driver's line of sight during the coupling process. Accordingly, without the aid of another individual, the driver must guess how far to back up the vehicle before the trailer hitch is aligned with the trailer's coupling device, which frequently results in contact between the trailer coupling device and the back portion of the vehicle. This contact often causes damage to the paint or structural integrity of the vehicle's bumper, tailgate, trunk lid, license plate, or any other area of the car in which the coupling hitch makes contact. Additionally, because trailer coupling devices are frequently stored and utilized outdoors, these devices are frequently exposed to adverse weather conditions. Unless the trailer coupling device is covered, adverse weather conditions can negatively impact the aesthetic appearance and structural integrity of the trailer coupling device.

Accordingly, a need exists in the art for a trailer coupling device cover that prevents or reduces the damage incurred by a vehicle when the vehicle is backed into a trailer coupling device during the coupling process. Furthermore, a need exists in the art for a trailer coupling device cover that can achieves this function while also protecting a trailer's coupling device in adverse weather conditions.

SUMMARY

The present invention is directed to a protective cover for a trailer coupling device. The protective cover comprises a hollowed shaft having a first end and second end for housing a trailer coupling device and a protective pad that is joined to the first end of the shaft. The protective cover is utilized with conventional trailer coupling devices typically made up of a socket portion that intercepts and rests upon a vehicle's trailer hitch during the coupling process, a locking lever, and an underjaw mechanism that securely locks a vehicle's trailer hitch within the socket portion of the trailer's coupling device when the locking lever is moved from a vertical, upright position to a horizontal position.

In one preferred embodiment, the shaft of the protective cover contains an opening of a sufficient length and width as to permit the locking lever of a trailer coupling device regardless of whether the locking lever is in its vertical or horizontal position. In another preferred embodiment, the opening is only of a sufficient length and width as to permit the locking lever to pass through the protective cover when it is in its vertical position. In one embodiment, slits of a particular length and width extend from the side panels of the second end of the shaft to enable the second end of the protective cover to slide past any protruding material that may exist on a trailer coupling device.

In another preferred embodiment, the protective pad is enlarged relative to the first end of the shaft in which it is adjoined; in this embodiment the protective pad is sized and positioned such that it creates at least one perpendicular plane between the protective pad and the first end of the shaft. Another advantageous embodiment involves the protective pad being centered on the first end of the shaft and enlarged such that the outer perimeter of the protective pad is greater than that of the first end of the shaft to which the protective pad is connected. Another preferred embodiment of the invention involves the protective cover existing as a single, continuous mold where the mold has a shaft portion and protective pad portion. The mold is preferably made of a rubber material that is resistant to water.

To use the protective cover, the user first aligns the second end of the shaft with the trailer coupling device such that the second end of the shaft is parallel to the socket portion of the trailer coupling device. Once the protective cover is properly aligned, the user then pushes the protective cover backwards onto the trailer's coupling device until the protective pad is adjacent to the socket portion of the trailer's coupling device. Alternatively, if the embodiment of the invention that incorporates an opening for the locking lever of a trailer coupling device to pass trough is used, the user begins the installation process by first holding the protective cover in a horizontal fashion above the trailer coupling device. Specifically, the user holds the protective cover in a horizontal fashion such that the opening within the protective cover's shaft is aligned with the trailer coupling device's locking lever. The user then lowers the protective cover onto the trailer's coupling device until the cover rests securely upon the trailer's coupling device.

When the protective cover is successfully installed on a trailer's coupling device, the protective pad will be positioned such that if a driver backs a vehicle too far back during the coupling process only the protective pad of the protective cover will contact the vehicle. Moreover, upon successful installation of the protective cover, the majority of the trailer's coupling device will be housed within the protective cover, thus generally protecting the trailer's coupling device from adverse weather conditions such as rain. Thus, the protective cover is used not only to prevent or reduce damage to a vehicle during the coupling process but also for protecting the trailer's coupling device from adverse weather conditions that can negatively affect the trailer's coupling device. Moreover, because the protective cover can be installed and removed form a trailer coupling device easily and without any hardware, the protective cover can be removed and utilized with other trailers as the user desires.

Accordingly, one object of the present invention is to provide a protective cover which prevents or reduces damage to a vehicle when a driver inadvertently backs the vehicle into a trailer's coupling device.

Another object of the present invention is to provide a protective cover for protecting a trailer coupling device from adverse weather conditions.

Another object of the present invention is to provide a protective cover that can be easily installed, removed, and transferred to other trailers.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
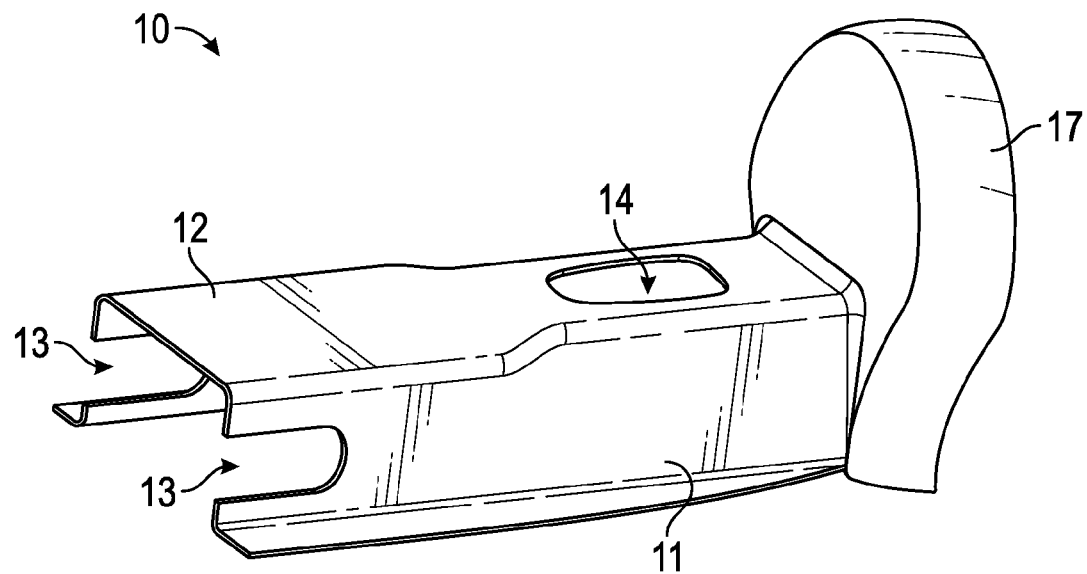
FIG. 1 shows a perspective view of a cover in accordance with the present invention.

Turning now to the drawings, FIG. 1 illustrates a preferred embodiment of the present invention. In one aspect, a protective cover 10 for a trailer coupling comprises a generally hollow body having a first end 11 and a second end 12. The cover 10 is generally hollow and comprises an inner core spanning a length between the first end 11 and the second end 12 of the cover 10. A protective element 17 is connected to the first end 11 of the cover 10. In a preferred embodiment the protective element 17 is made of a rubber material. In yet another embodiment the protective element 17 is made of a plastic material. In yet another embodiment the protective element 17 comprises a gel or similar material.

As illustrated in FIG. 1, in a preferred embodiment the protective element 17 is connected to the first end 11 of the cover 10 such that at least one perpendicular plane exists between the protective element 17 and the first end 11. Nonetheless, alternative embodiments of the invention may comprise the protective element 17 being connected to the first end 11 of the cover body such that an angular plane exists between the protective element 17 and the body 11.

Figure 2:
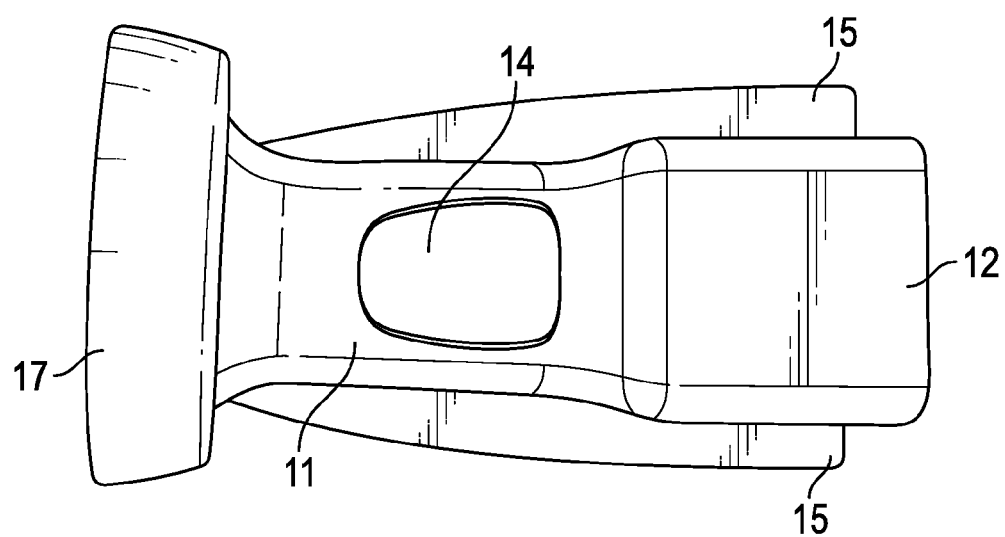
FIG. 2 shows a top view of a cover in accordance with the present invention.

As illustrated in FIG. 1 and FIG. 2, in a preferred embodiment the cover body has an opening 14 of sufficient length and width such that a locking lever of a trailer coupling device 20 can pass through the opening 14 of the body. As further illustrated in FIG. 2, the protective cover 10 of the present invention may comprise flanges 15.

Figure 6:
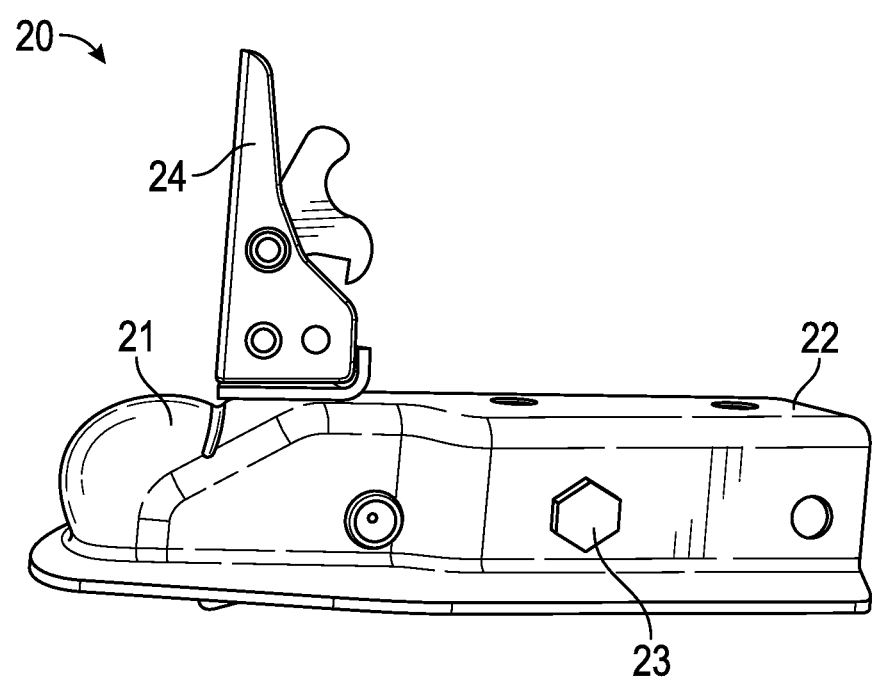
FIG. 6 shows a side view of coupling device used in accordance with the present invention.
Figure 7A:
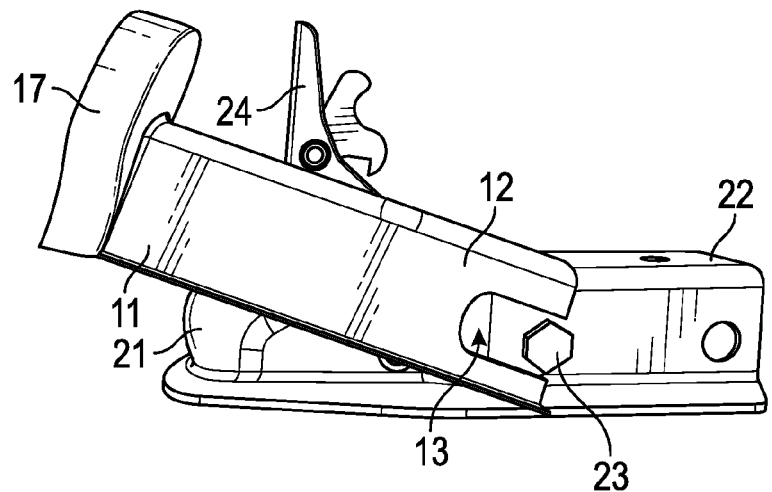
FIG. 7A shows a side view of a cover being installed in accordance with the present invention.
Figure 7B:
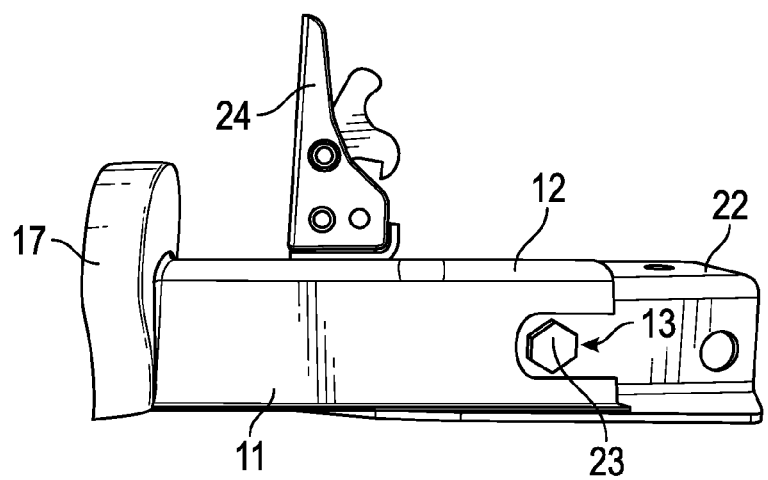
FIG. 7B shows a side view of a cover being installed in accordance with the present invention.
Figure 7C:
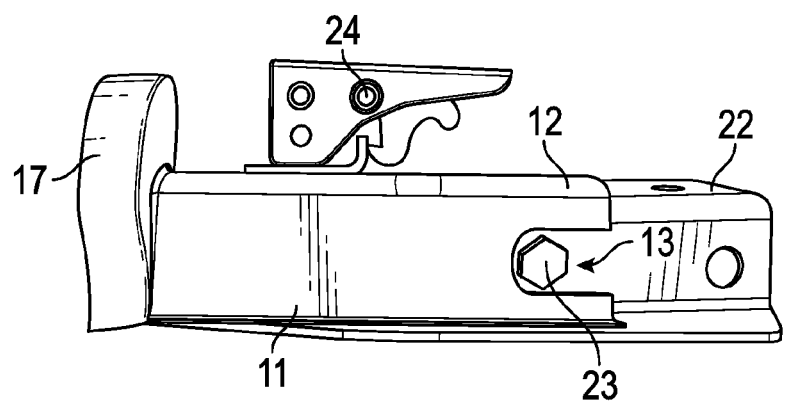
FIG. 7C shows a side view of a cover being installed in accordance with the present invention.

The protective cover 10 may be made of two sidewalls and a ceiling wall. The device 10 may include a slot 13 on one or both of the sidewalls. The slots 13 are configured to extend longitudinally from the second end 12 towards the front end 11. The protective cover 10 is configured to cover a standard coupling device, as illustrated in FIG. 6. The coupling device 20, includes a locking lever 24, first end 21, back end 22, and bolt 23. As illustrated in FIGS. 7A-7C, the slots 13 are configured such that the body of the cover 10 may slide past bolts 23 of the coupler 20. In this way the cover 10 may be secured onto the coupler 20. Additionally, the slots 13 may allow the cover 10 to slide past other protruding elements 23 when the protective cover 10 is placed onto a trailer-coupling device 20.

Figure 4:
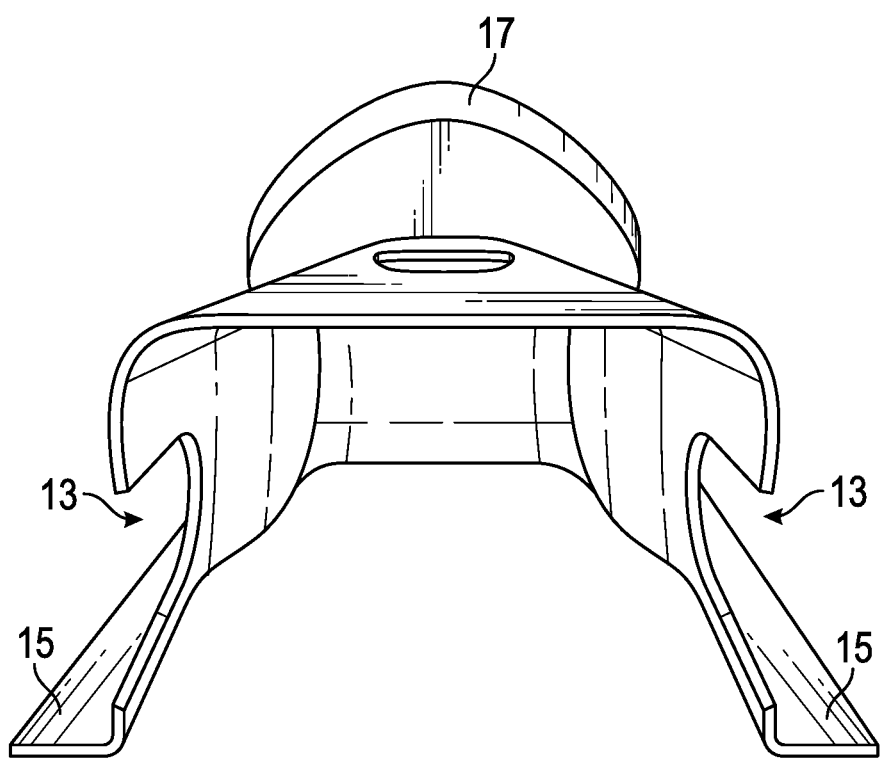
FIG. 4 shows a back view of a cover in accordance with the present invention.
Figure 5:
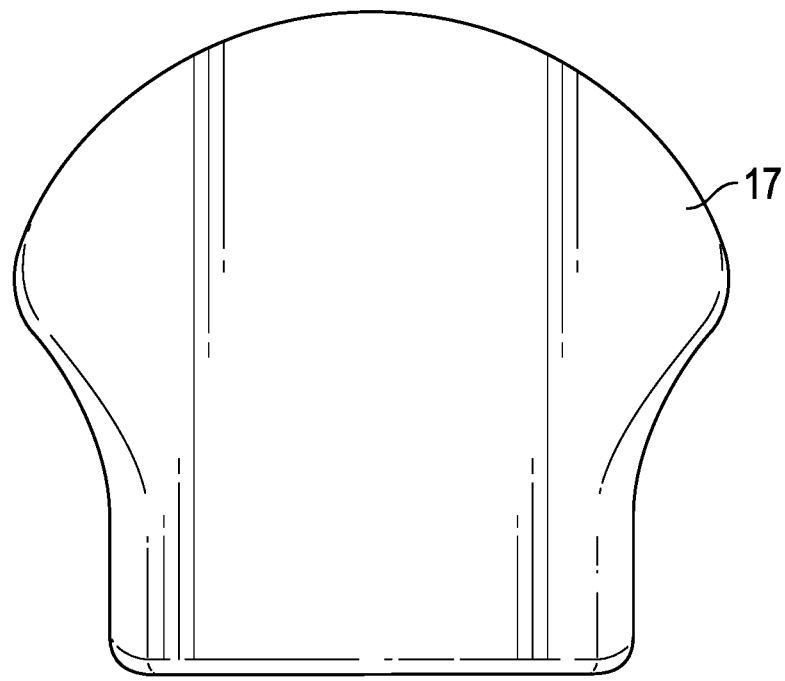
FIG. 5 shows a front view of cover in accordance with the present invention.

As illustrated in FIG. 1 and FIG. 4, a preferred embodiment of the protective cover 10 comprises a body configured in a generally rectangular cuboid shape. This shape is based on a standard trailer coupling device 20 as illustrated in FIG. 6. It is understood that the body of the cover may take many shapes and fall within the scope of the invention.

Figure 3:
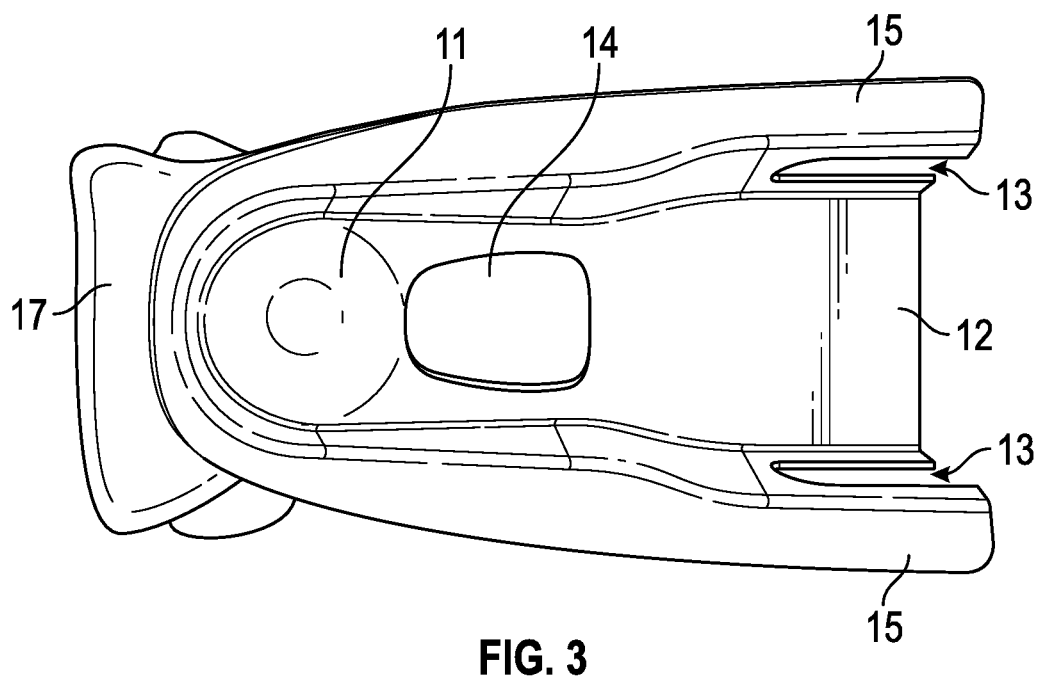
FIG. 3 shows a bottom view of a cover in accordance with the present invention.

A preferred embodiment of a protective cover 10 for a trailer coupling 20 includes a shaft portion having a first end 11 and a second end 12. As illustrated in FIG. 3 and FIG. 4, the shaft portion has an inner core that is generally hollowed from the first end 11 to the second end 12 such that a trailer coupling device can be housed within the shaft portion. As illustrated in FIG. 3, the first end 11 of the shaft portion inner core may be configured in a generally round shape to fit securely around the first end 21 of a coupler 20. Similarly, the second end 12 of the shaft portion inner core may be configured in a generally square shape to fit securely around the second end 22 of a coupler. A protective pad portion 17 is located at the first end 11 of the shaft portion.

As illustrated in FIG. 4, the shaft portion of the cover comprises a first sidewall, a second sidewall, and a ceiling wall. As further illustrated in FIGS. 7A-7C, the ceiling wall rests upon the upper horizontal plane of a trailer coupling device 20. The first sidewall is positioned parallel to one vertical sidewall of a trailer coupling device 20. The second sidewall is positioned parallel to the opposite vertical sidewall of a trailer coupling device 20 when the protective cover 10 is placed on a trailer coupling device 20.

In an exemplary embodiment, as illustrated in FIG. 1 and FIG. 2, the protective cover ceiling wall has an opening 14 of sufficient length and width to allow a locking lever 24 of a trailer coupling device 20 to pass through the opening 14 when the protective cover 10 is placed on a trailer coupling device 20 and the locking lever 24 is in an upright position. FIG. 6 illustrates a standard trailer coupling device. FIG. 7A-7C illustrate a preferred method of securing a protective cover 10 onto a standard trailer coupling device 20. The cover 10 is placed above the coupling device 20 with the locking pin 24 aligned with the ceiling hole 14 and the side wall slots 13 aligned with the bolt 23, or other protruding element 23. Once aligned, the cover 10 is slid down onto the trailer coupling device 20, as illustrated in FIG. 7B. At this stage the sidewall slots 13 have slid past the bolt 23 and the locking pin 24 is protruding through the ceiling wall 14. Once the locking pin 24 is pushed downward and secured in place, the protective cover 10 is secured atop the coupling device 20, as illustrated in FIG. 7C.

Although it is preferred that a slot 13 exists in the sidewall of each of the sides of the cover 10, it is possible to secure the cover 10 set forth herein with only one slot 13. The slots 13 are generally of sufficient length and width such that the second end 12 of the shaft portion can slide past a protruding element 23 when the protective cover 10 is placed onto a trailer coupling device 20.

It is understood that the device disclosed herein may be manufactured in a number of ways with a number of materials, all known to those of skill in the art. A preferred method of creating a protective cover 10 disclosed herein is with the use of a mold. Preferably, as illustrated in FIG. 4, the shaft portion of the mold is a cuboid. It is further preferred that the device be made of a rubber material. However, it is possible to form the product disclosed herein with plastics and other materials known to those of skill in the art.

In a preferred embodiment, the protective cover device 10 for a trailer coupling 20 comprises a mold 10 having a hollowed shaft portion. The hollowed shaft portion has a first end 11 and a second end 12. The shaft portion is of a generally rectangular cuboid shape and consists of a first wall, a second wall, and a ceiling wall. The ceiling wall rests on top of a trailer coupling device 20 when the protective cover is in use and the ceiling wall has an opening 14 of sufficient length and width as to permit an upright locking lever 24 of a trailer coupling device 20 to pass through when the protective cover 10 is installed. The first sidewall and the second sidewall comprise a slot 13 that is of sufficient size and shape as to permit the second end 12 of the shaft portion to slide past a protruding material 23 when the protective cover 10 is installed. A protective pad portion 17 is connected to the first end 11 of the shaft portion. In one embodiment the perimeter of the face of the protective pad portion 17 is greater than the perimeter of the first end 11 of the shaft portion.

What is claimed is:

1. A protective cover device for a trailer coupling comprising:
   a. a generally hollow body having a first end and a second end, wherein said body has an inner core spanning a length between said first end and said second end and an opening; and
   b. a protective element, wherein said protective element is connected to said first end of said body,
      wherein the shape of the body is such that an upper horizontal plane and two vertical sidewalls of the trailer coupling device are at least partially housed within the inner core of the body when the first end of the body is in alignment with a first end of the trailer coupling device and the protective cover is placed on top of the trailer coupling device, and
      wherein the opening is sized and positioned within the body such that a locking lever of a trailer coupling device passes through the protective cover via the opening to an environment opposite the inner core when the first end of the body is in alignment with a first end of the trailer coupling device and the protective cover is placed on top of the trailer coupling device.

2. The protective cover of claim 1, wherein said body has two side walls and a ceiling wall, wherein at least one side wall has a slot extending longitudinally from said second end, wherein said slot is of sufficient length and width such that said second end of said body can slide past a protruding element when the protective cover is placed onto the trailer coupling device.

3. The protective cover of claim 1, wherein said body has two side walls and a ceiling wall, wherein both side walls have a slot extending longitudinally from said second end, wherein said slots are of sufficient length and width such that said second end of said body can slide past protruding elements when the protective cover is placed onto the trailer coupling device.

4. The protective cover of claim 1, wherein said protective element is connected to said first end of said body such that at least one perpendicular plane exists between said protective element and said body.

5. The protective cover of claim 1, wherein said body is made of a rubber material.

6. The protective cover of claim 1, wherein said protective element is made of a rubber material.

7. The protective cover of claim 1, wherein said body is of a rectangular cuboid shape.

8. The protective cover of claim 7, wherein said body comprises only three sides.

9. A protective cover device for a trailer coupling comprising:
   a. a shaft portion having a first end and a second end, wherein said shaft portion has an inner core and an opening,
      wherein the opening is sized and positioned such that a locking lever of the trailer coupling device passes through the protective cover via the opening to an environment opposite the inner core when the first end of the shaft portion is in alignment with a first end of the trailer coupling device and the protective cover is placed on top of the trailer coupling device, and wherein said inner core is hollowed from said first end to said second end such that an upper horizontal plane and two vertical sidewalls of the trailer coupling device are at least partially housed within said shaft portion when the first end of the shaft portion is in alignment with the trailer coupling device and the protective cover is placed on top of the trailer coupling device; and
   b. a protective pad portion, wherein said protective pad portion is located at said first end of said shaft portion.

10. The protective cover of claim 9, wherein said shaft portion comprises a first sidewall, a second sidewall, and a ceiling wall, wherein said ceiling wall rests upon the upper horizontal plane of the trailer coupling device, said first sidewall being positioned parallel to one vertical sidewall of the trailer coupling device, and said second sidewall being positioned parallel to an opposite vertical sidewall of the trailer coupling device when the protective cover is placed on top the trailer coupling device.

11. The protective cover of claim 10, wherein the opening is located within said ceiling wall between the first end and the second end of the shaft portion.

12. The protective cover of claim 10, wherein there is a slot in at least one sidewall of said shaft portion, said slot being of sufficient length and width such that said second end of said shaft portion can slide past a protruding element when the protective cover is placed onto the trailer coupling device.

13. The protective cover of claim 10, wherein there is a slot in each of the sidewalls of said shaft portion, said slots being of sufficient length and width such that said second end of said shaft portion can slide past protruding elements when the protective cover is placed onto the trailer coupling device.

14. The protective cover of claim 10, wherein said shaft portion is of a rectangular cuboid shape.

15. The protective cover of claim 9, wherein the protective cover is made of a rubber material.

16. The protective over of claim 12, wherein the protective cover is formed to fit all dimensions of the trailer coupling device except for the bottom portion of the coupling device which faces and is oriented parallel to a ground surface.

17. A protective cover device for a trailer coupling comprising:
   a. a hollowed shaft portion having a first end and a second end, wherein said shaft portion is of a generally rectangular cuboid shape and consists of a first wall, a second wall, and a ceiling wall; wherein said ceiling wall rests on top of the trailer coupling device when the protective cover is in use and said ceiling wall has an opening of sufficient length and width as to permit an upright locking lever of the trailer coupling device to pass through when the protective cover is installed, and wherein said first sidewall and said second sidewall comprise a slot, wherein said slot is of sufficient size and shape as to permit said second end of said shaft portion to slide past a protruding material when the protective cover is installed; and
   b. a protective pad portion, wherein said protective pad portion is connected upon said first end of said shaft portion and the perimeter of the face of said protective portion is greater than the perimeter of said first end of the shaft portion.

18. The protective cover of claim 17, wherein said protective cover is made of a rubber material.

* * * * *